US008733292B2

(12) United States Patent
Nichols

(10) Patent No.: US 8,733,292 B2
(45) Date of Patent: May 27, 2014

(54) COLLAPSIBLE, MOUNTABLE ANIMAL CRATE

(76) Inventor: Amy R Nichols, North Bethesda, MD (US)

( * ) Notice: Subject to any disclaimer, the term of this patent is extended or adjusted under 35 U.S.C. 154(b) by 184 days.

(21) Appl. No.: 13/185,703

(22) Filed: Jul. 19, 2011

(65) Prior Publication Data

US 2012/0145087 A1 Jun. 14, 2012

Related U.S. Application Data

(60) Provisional application No. 61/423,021, filed on Dec. 14, 2010.

(51) Int. Cl.
*A01K 1/02* (2006.01)
*A01K 1/03* (2006.01)
*A01K 31/06* (2006.01)

(52) U.S. Cl.
USPC ............ 119/474; 119/452; 119/482; 119/498

(58) Field of Classification Search
USPC ......... 119/474, 452–454, 482, 496, 498, 499, 119/472, 473, 512, 513, 514, 519, 416, 119/431; D30/108, 114, 116, 109, 119
See application file for complete search history.

(56) References Cited

U.S. PATENT DOCUMENTS

| | | | |
|---|---|---|---|
| 2,456,479 A | 12/1948 | Antil | |
| 3,896,766 A | 7/1975 | Martin | |
| 4,590,885 A * | 5/1986 | Sugiura | 119/497 |
| 4,762,085 A | 8/1988 | Ondrasik | |
| 4,917,047 A | 4/1990 | Wazeter, III | |
| 5,549,073 A | 8/1996 | Askins et al. | |
| 5,878,694 A * | 3/1999 | Irwin | 119/452 |
| 6,092,488 A * | 7/2000 | Allawas | 119/497 |
| 6,345,591 B1 * | 2/2002 | Richmond | 119/497 |
| 6,681,720 B1 * | 1/2004 | Skurdalsvold et al. | 119/474 |
| 6,722,315 B2 | 4/2004 | Sinor | |
| 6,892,673 B2 * | 5/2005 | Zwezdaryk | 119/257 |
| 6,997,138 B1 * | 2/2006 | Simpson | 119/499 |
| 7,343,876 B2 | 3/2008 | Frisbee | |
| 8,267,048 B2 * | 9/2012 | Flannery et al. | 119/498 |
| 2004/0194725 A1 | 10/2004 | Ozeri et al. | |
| 2005/0034679 A1 | 2/2005 | Link | |
| 2007/0000447 A1 * | 1/2007 | Jakubowski et al. | 119/453 |
| 2008/0245313 A1 * | 10/2008 | Jakubowski et al. | 119/497 |
| 2010/0089336 A1 | 4/2010 | Flannery et al. | |

FOREIGN PATENT DOCUMENTS

| | | | |
|---|---|---|---|
| JP | 08-056521 A | 3/1996 | |
| JP | 2000-125685 A | 5/2000 | |

* cited by examiner

*Primary Examiner* — Andrea Valenti

(74) *Attorney, Agent, or Firm* — Rob L. Phillips; Greenberg Traurig, LLP

(57) ABSTRACT

A collapsible, mountable pet crate. A collapsible crate mountable to a wall such that the crate may be assembled for pet usage while mounted to the wall and collapsed into a compact package while mounted to the wall and not being used. A mounting bracket affixed to the wall receives a mounting rod (or mounting pins) integral with, or connected to, the crate to facilitate operation of the crate. The mounting bracket includes a first position for receipt of the mounting rod corresponding to the assembled or opened crate and a second position for receipt of the mounting rod corresponding to the collapsed or stowed crate. In another version, a pair of latches rotatably joined to a back wall for (i) joining the wall to the bottom tray in a collapsed configuration and (ii) securing the foldable cage to the back wall in an assembled configuration.

6 Claims, 25 Drawing Sheets

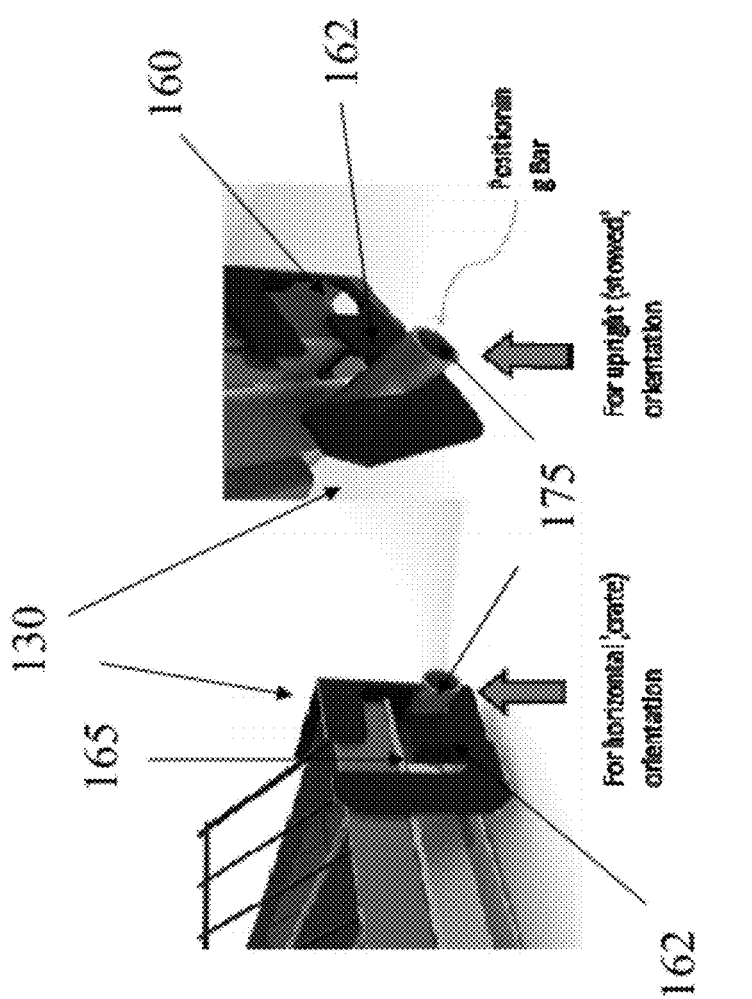

Easily slide thumb tabs inward to unlock cage. Slide thumb tabs back outward to lock cage in place. There are multiple thumb tabs per side to prevent accidental release.

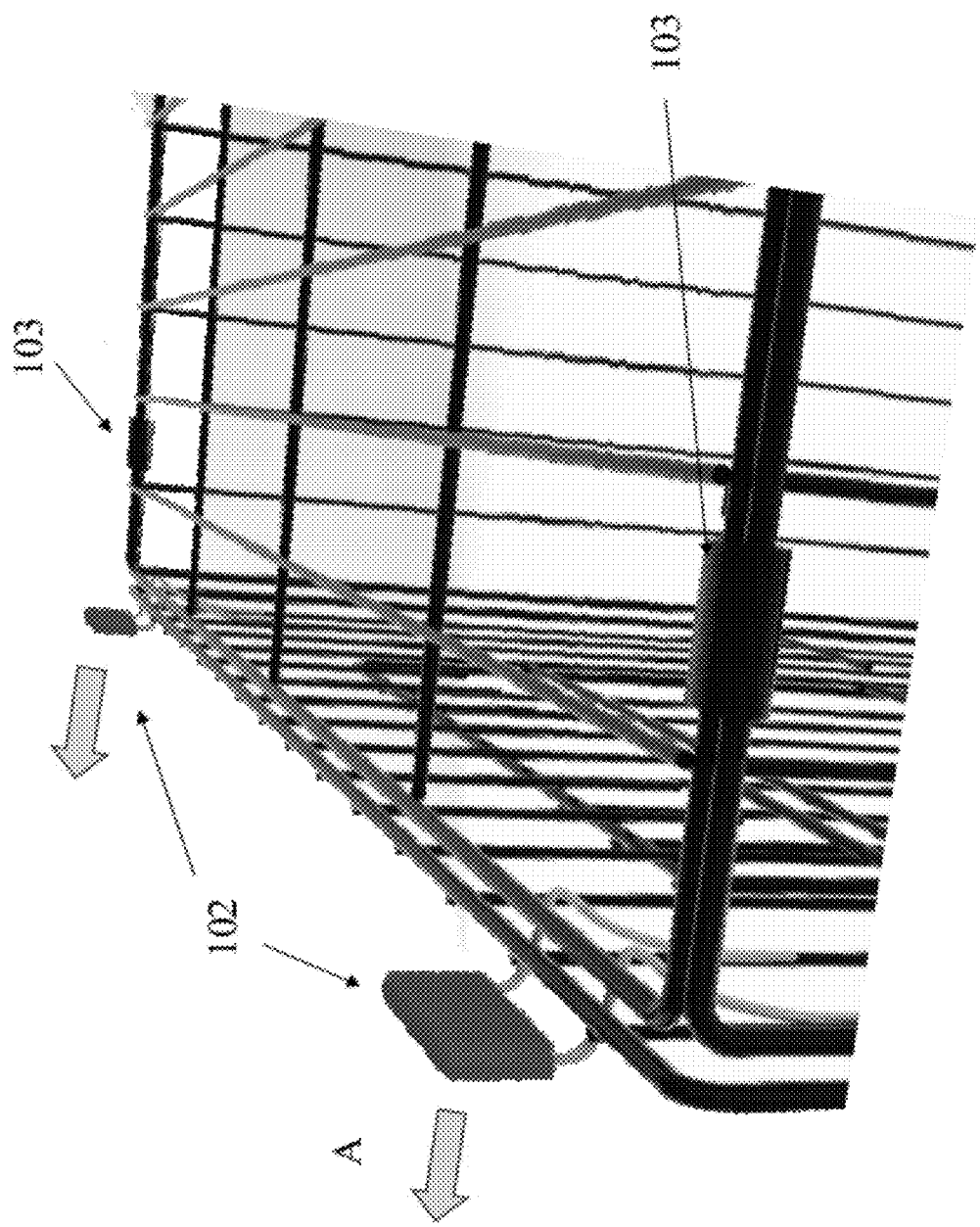

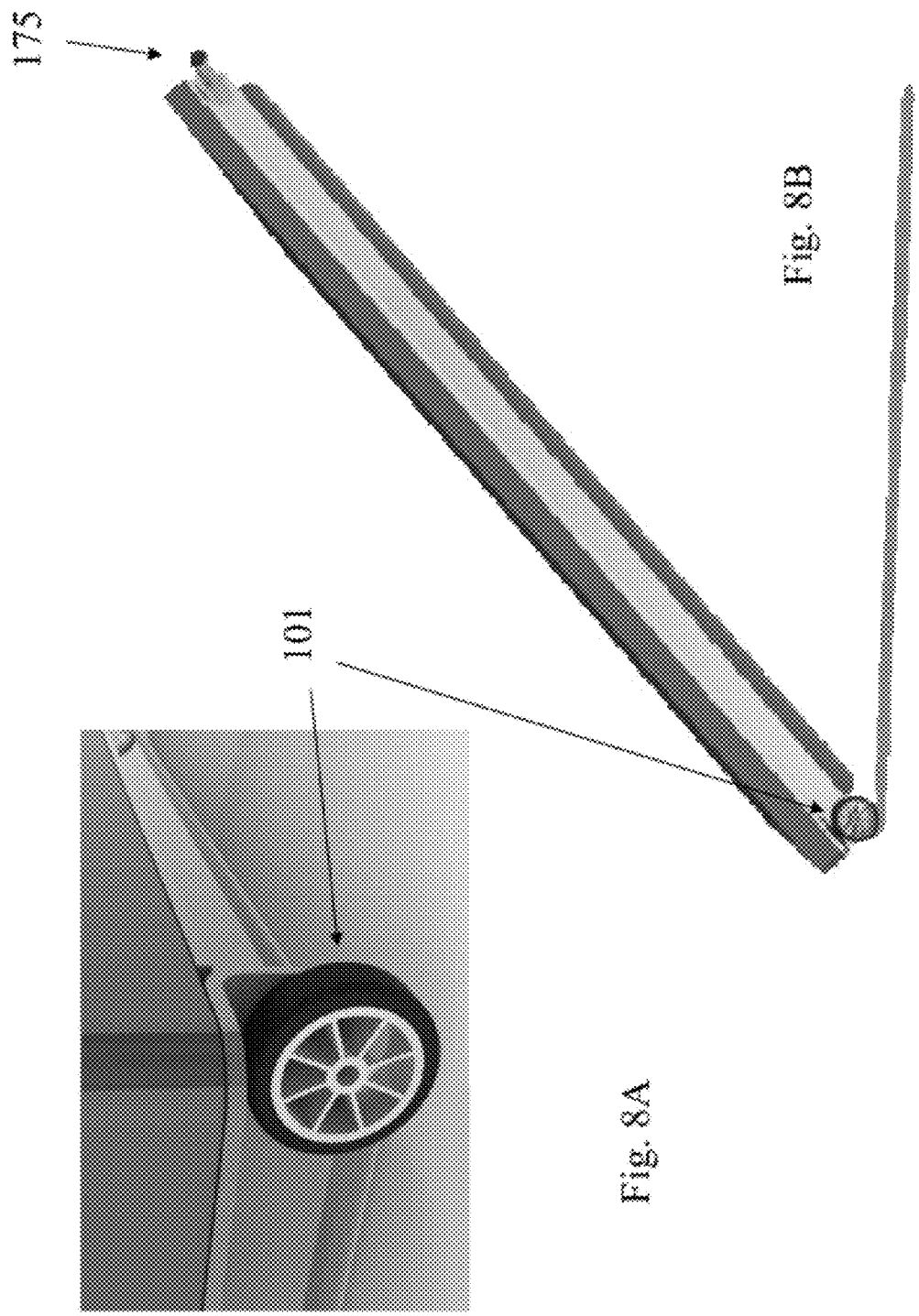

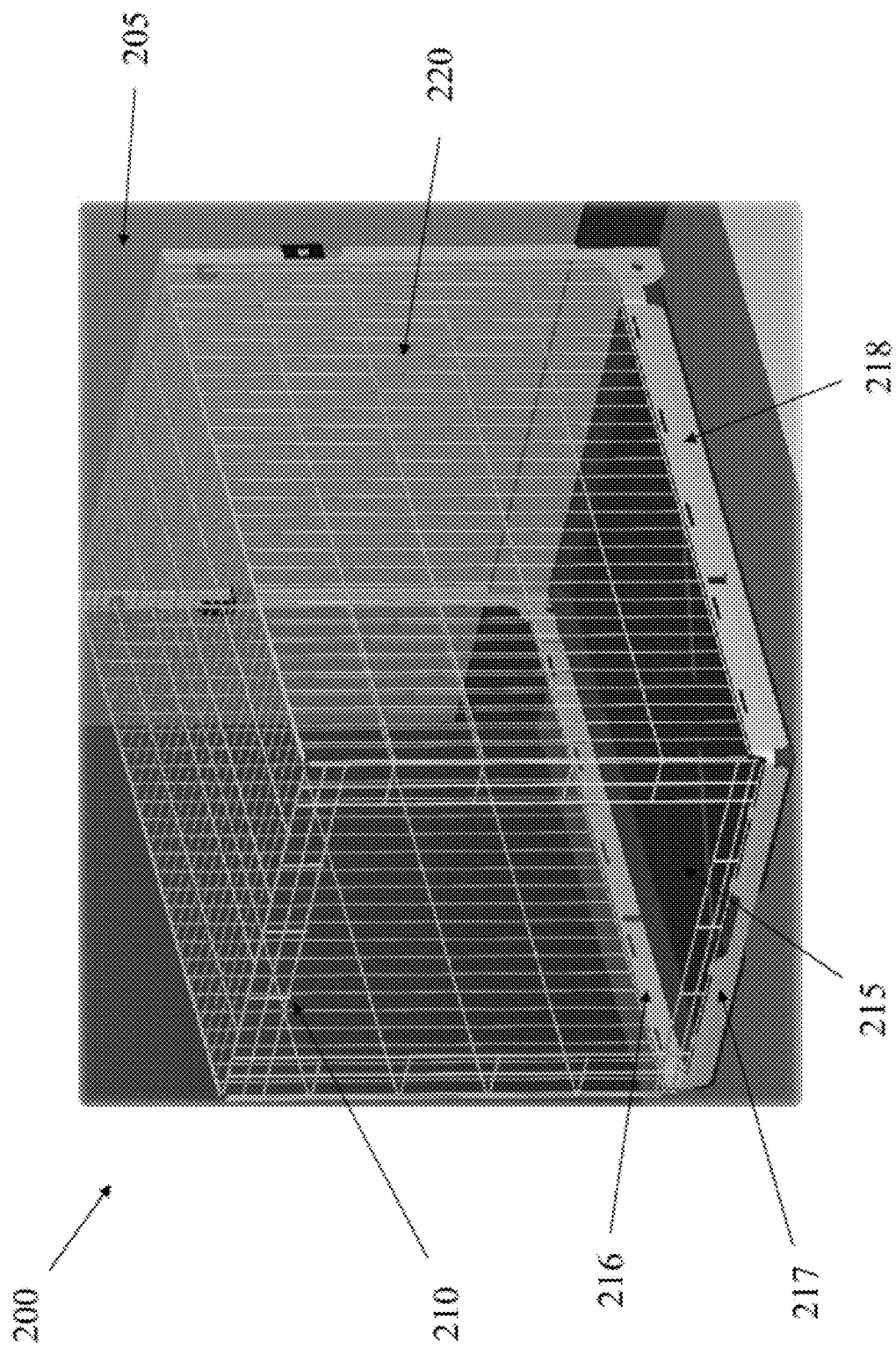

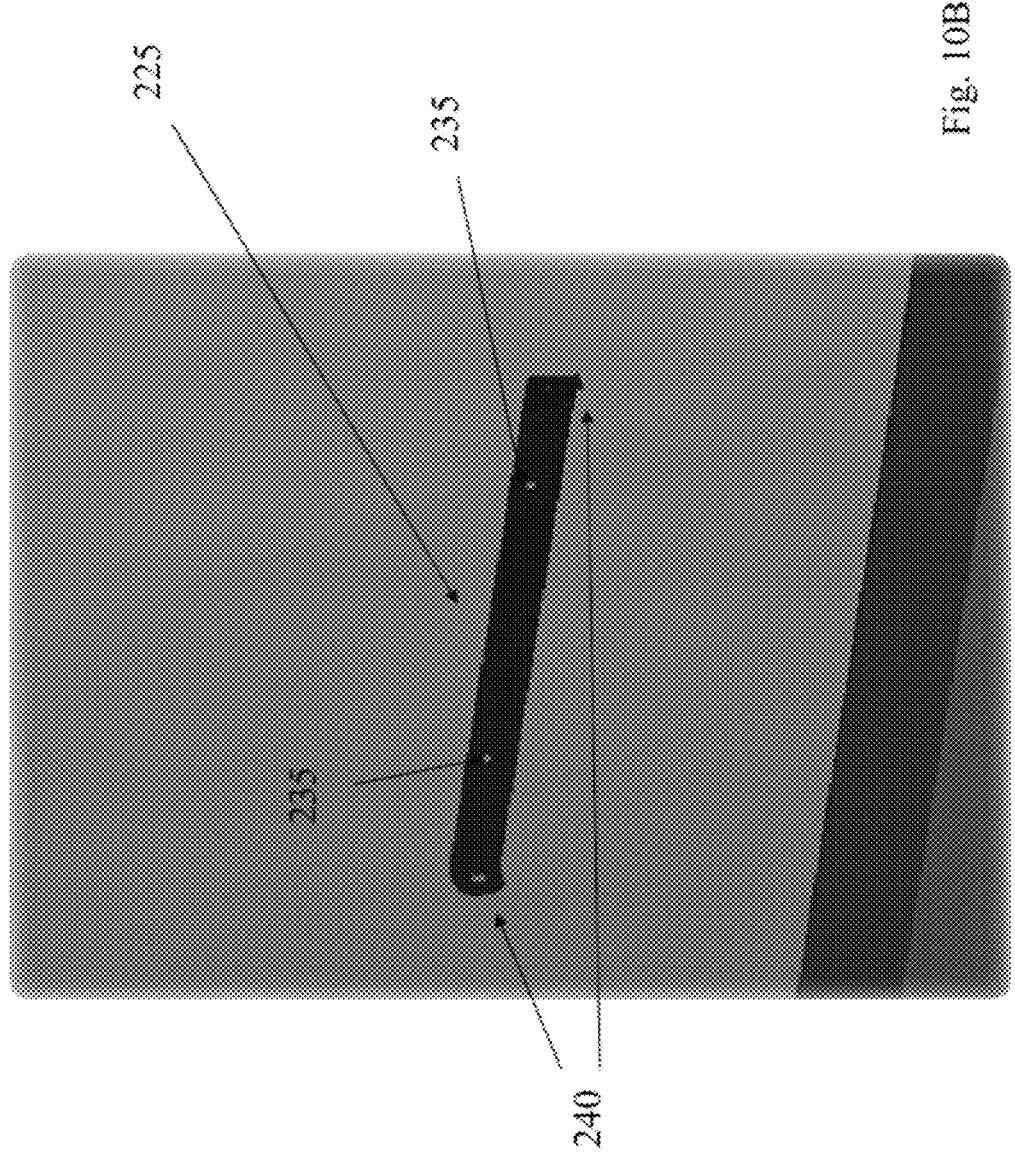

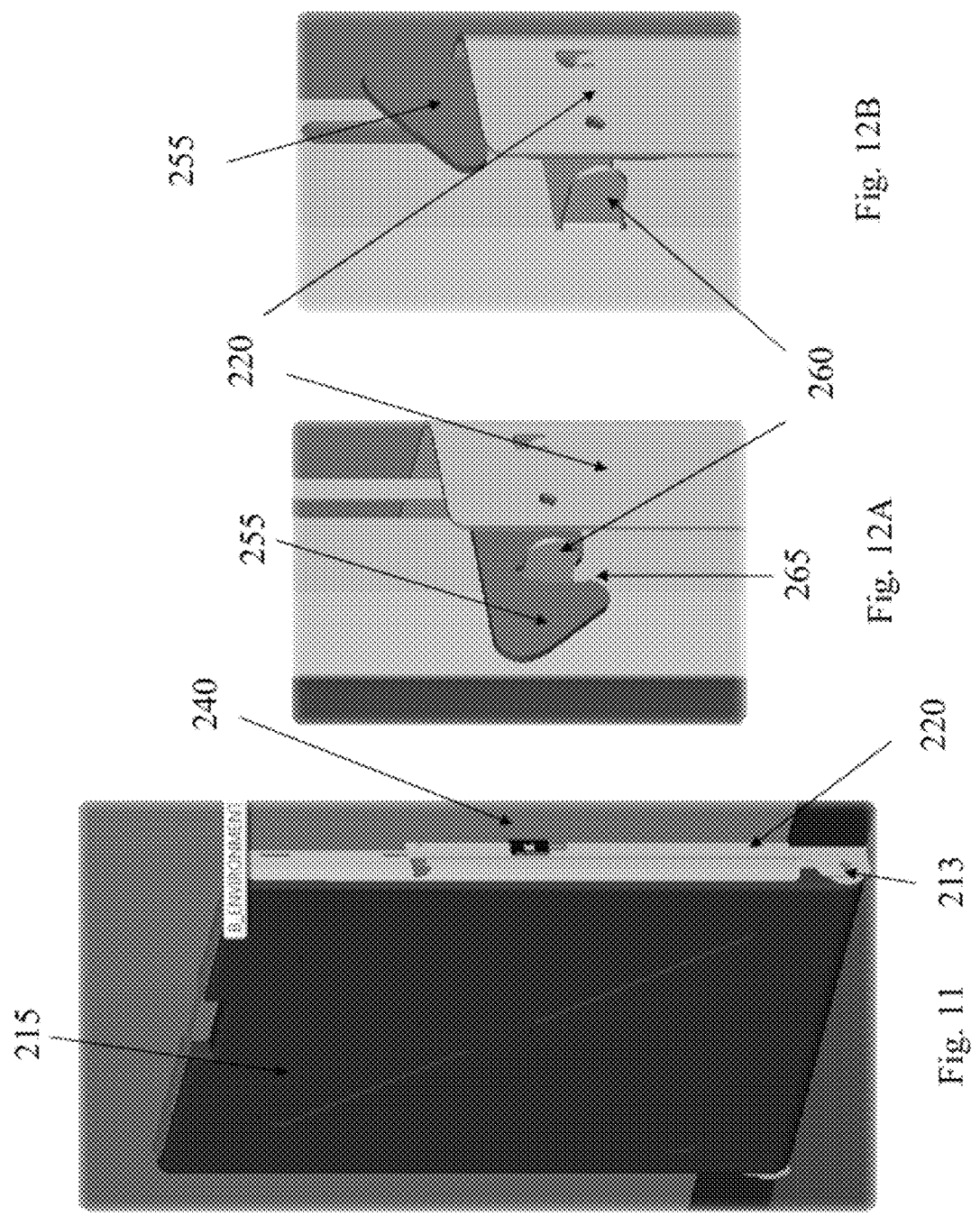

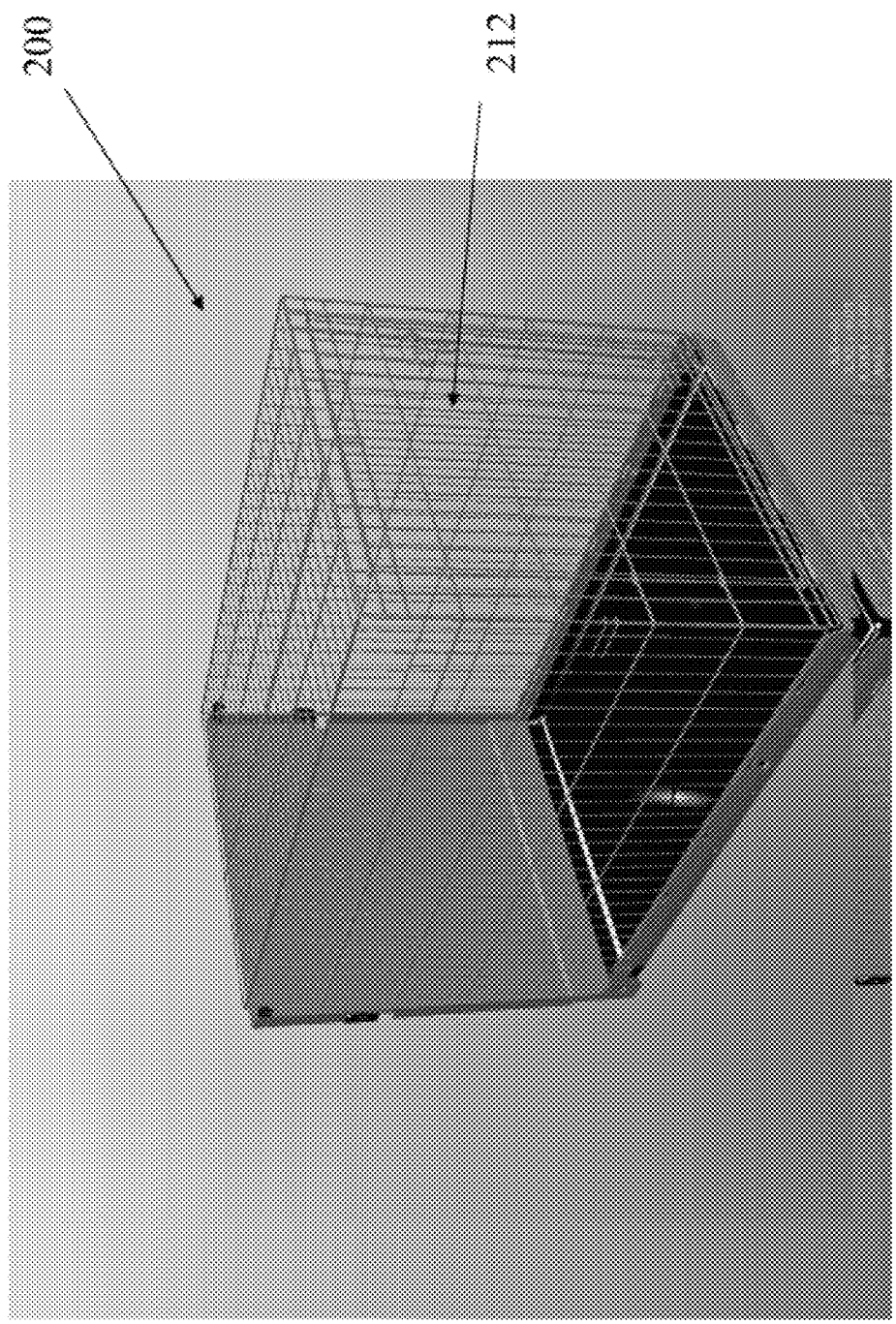

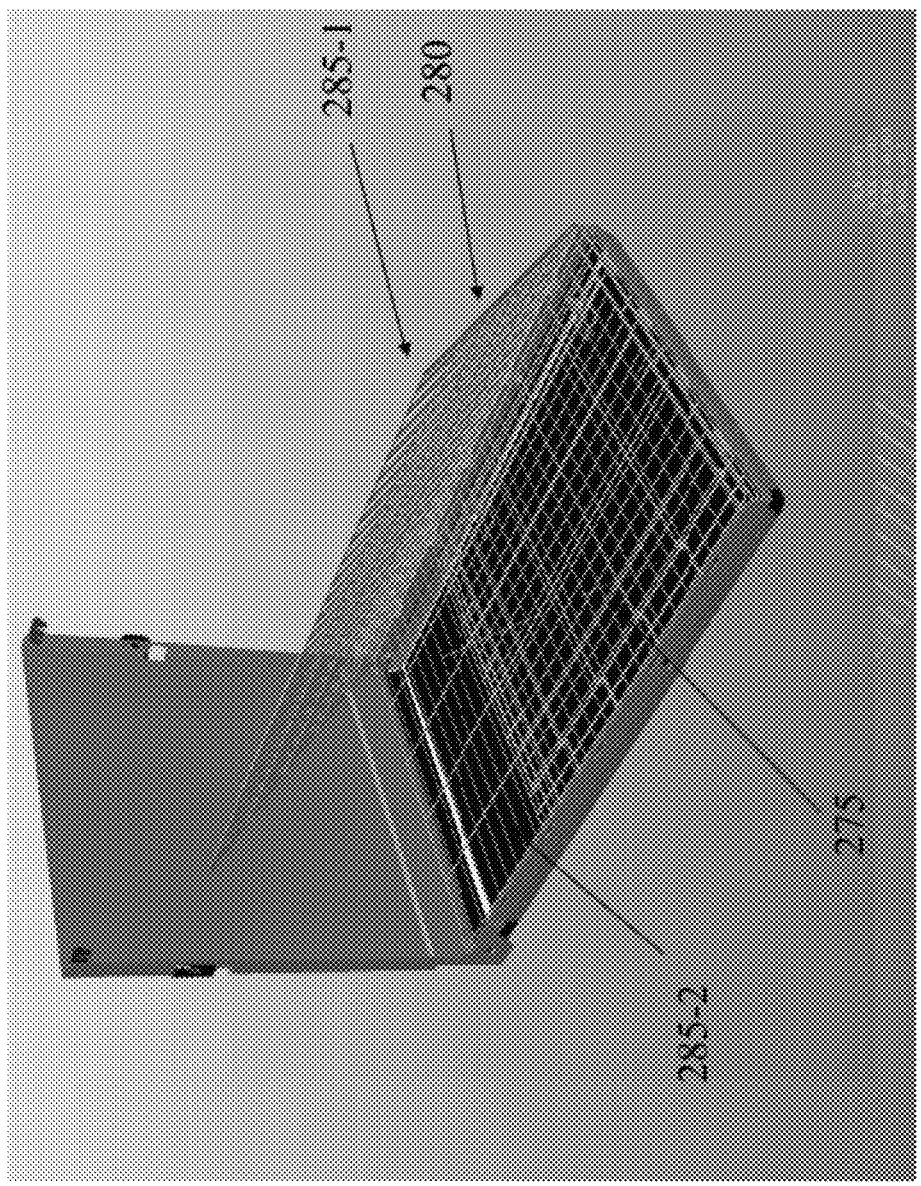

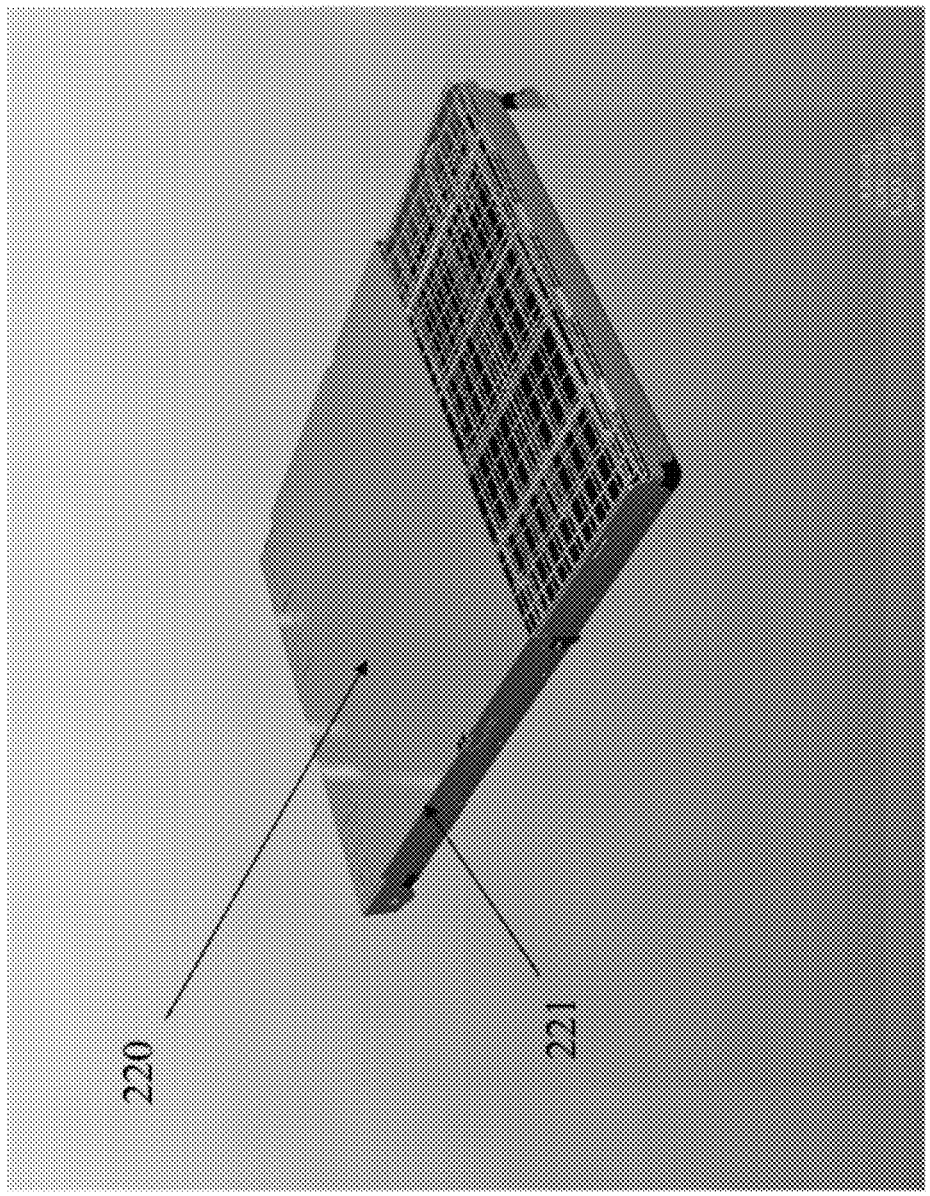

COLLAPSIBLE, MOUNTABLE ANIMAL CRATE

CROSS-REFERENCE

This application claims the benefit of U.S. Provisional Patent Application No. 61/423,021 filed on Dec. 14, 2010.

FIELD OF INVENTION

The embodiments of the present invention relate to an animal crate configured to fold and mount on a wall for storage.

BACKGROUND

Pets are kept in significant numbers throughout the United States and foreign countries. Many common pets, such as cats and dogs, require kennels or crates at various times. For example, some pet owners keep their pets in crates when the pet owner is away to prevent the pet from damaging the home or injuring itself. One drawback is that crates tend to be large and unsightly.

It would therefore be advantageous for crates to be collapsible and storable in a convenient and easy manner.

SUMMARY

Accordingly, a crate according to a first embodiment of the present invention involves a collapsible crate mountable to a wall such that said crate may be assembled for pet usage while mounted to the wall and collapsed into a compact package while mounted to the wall and not in use. In one embodiment, a mounting bracket affixed to the wall receives a mounting rod (or pins) integral with, or connected to, the crate to facilitate operation of the collapsible, mountable crate. In this embodiment, the mounting bracket includes a first position for receipt of the mounting rod corresponding to the assembled or opened crate and a second position for receipt of the mounting rod corresponding to the collapsed or stowed crate. With the embodiments of the present invention, the crate is continuously mounted to the wall as the crate transforms from an assembled configuration to a collapsed configuration and vice-versa.

Another embodiment of the present invention involves includes a foldable cage, bottom tray and back wall. Bottom edges of the cage are rotatably connected to the bottom tray and the bottom tray and back wall are rotatably joined along a common edge. Ends of a wall bracket extend at approximately 90 degrees relative to a wall mount base member and together define a space therebetween for receipt of the back wall. Clips on inner edges of each end of the bracket facilitate securing the back wall and animal crate to the mounted bracket. A pair of latches rotatably joined to the back wall operates to: (i) join the back wall to the bottom tray in a collapsed configuration and (ii) secure the foldable cage to the back wall in an assembled configuration.

Other variations, embodiments and features of the present invention will become evident from the following detailed description, drawings and claims.

BRIEF DESCRIPTION OF THE DRAWINGS

FIGS. 5A through 5C illustrate a mounting rod for use with the first embodiment crate in multiple positions according to the embodiments of the present invention;

FIG. 7 illustrates spring levers which maintain the cage of the first embodiment crate in an assembled configuration according to the embodiments of the present invention;

FIGS. 8A and 8B illustrate wheels rendering the first embodiment crate portable according to the embodiments of the present invention;

FIG. 9 illustrates a second embodiment crate in an assembled or open configuration according to the embodiments of the present invention;

FIGS. 10A and 10B illustrate a mounting bracket for the second embodiment crate according to the embodiments of the present invention;

FIG. 11 illustrates the second embodiment crate in a mounted and collapsed or stowed configuration according to the embodiments of the present invention;

FIGS. 12A and 12B illustrate a multi-use latch of the second embodiment crate in an open and closed position according to the embodiments of the present invention;

DETAILED DESCRIPTION

Figure 1:
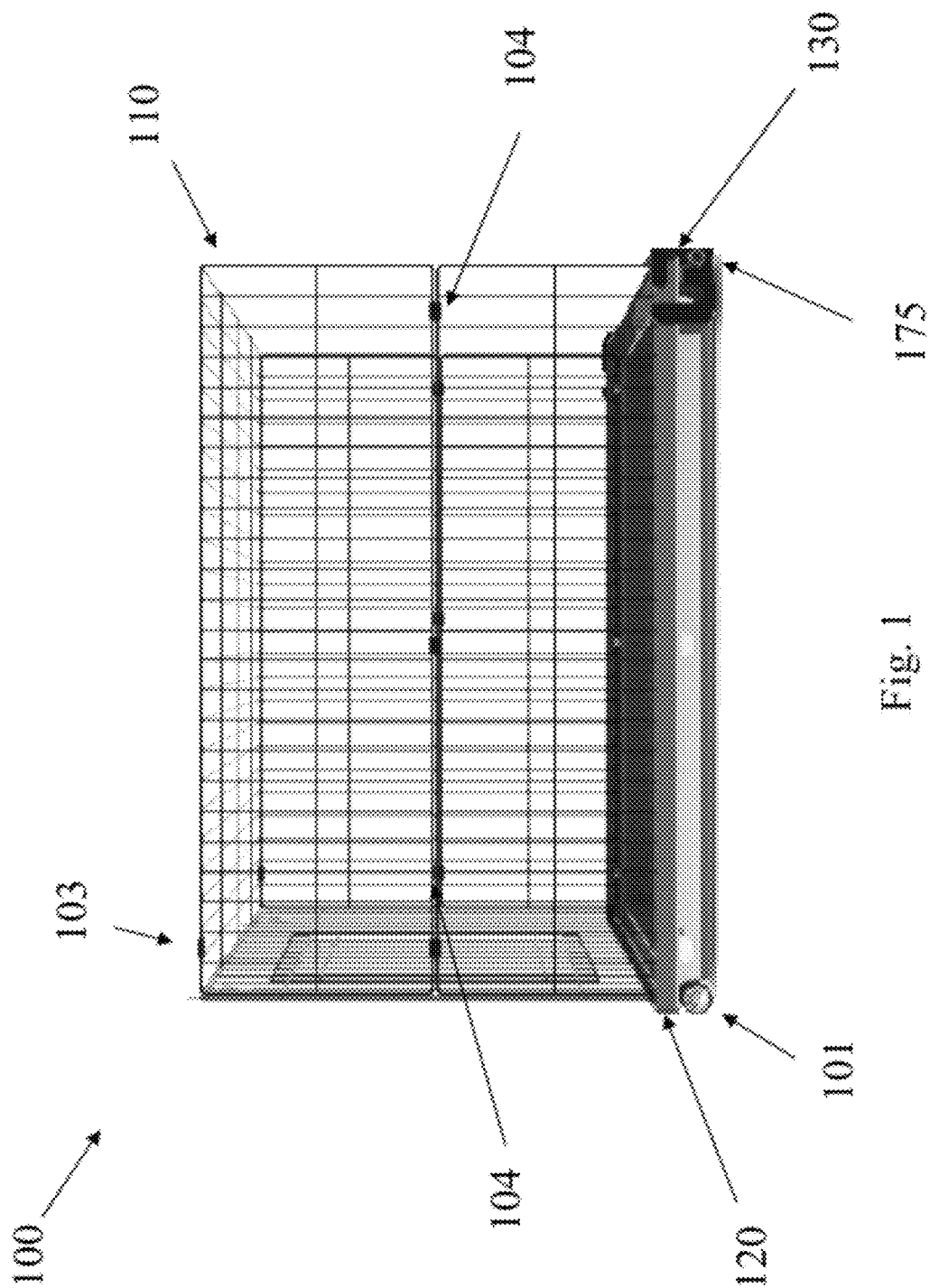
FIG. 1 illustrates a first embodiment crate in an assembled or open configuration according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 2:
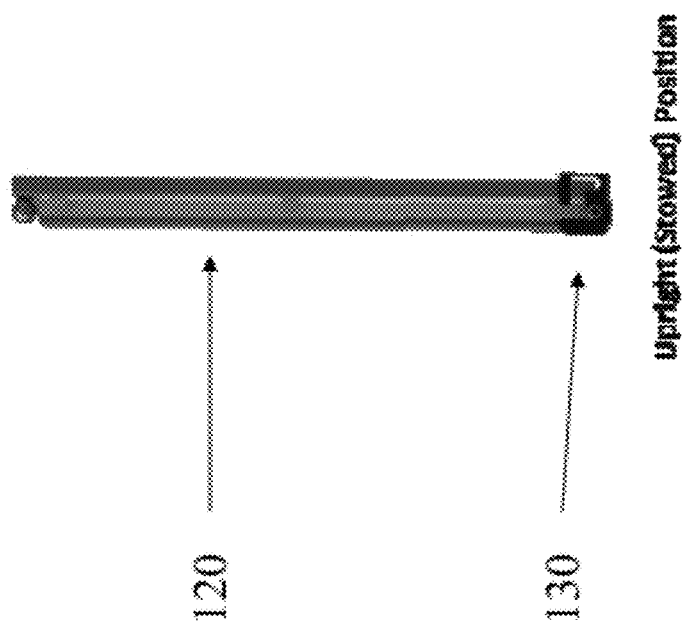
FIG. 2 illustrates the first embodiment crate in a mounted and collapsed or stowed configuration according to the embodiments of the present invention.
Figure 3:
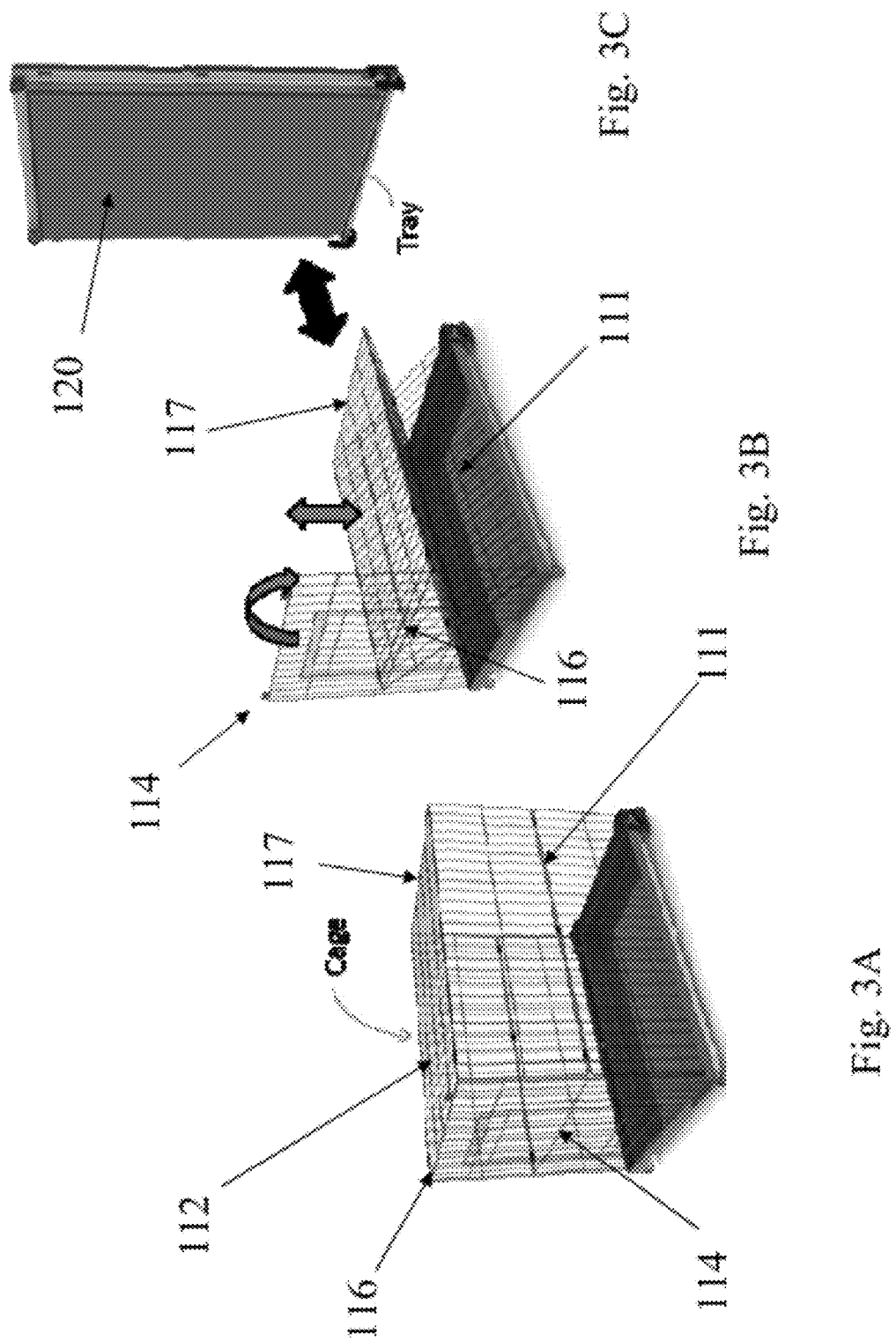
FIGS. 3A-3C illustrate the first embodiment crate being transformed from open configuration to collapsed configuration according to the embodiments of the present invention.

The embodiments of the present invention relate to a collapsible, mounted pet crate. FIG. 1 shows a pet crate 100 according to the embodiments of the present invention in an assembled or open configuration. The pet crate 100, as shown, includes a wire cage 110, bottom tray 120 and mounting bracket 130 which is configured to mount to a wall (not shown in FIGS. 1 and 2). FIG. 2 shows the pet crate 100 in a collapsed or stowed position. FIGS. 3A through 3C show the crate 100 being transformed from an assembled configuration on the ground (e.g., first position) to a collapsed configuration against a wall (e.g., second position). The transformation comprises folding the cage 110 into the bottom tray 120 and lifting the bottom tray 120 along with the contained cage 110 into the collapsed configuration as discussed more fully below.

Figure 4:
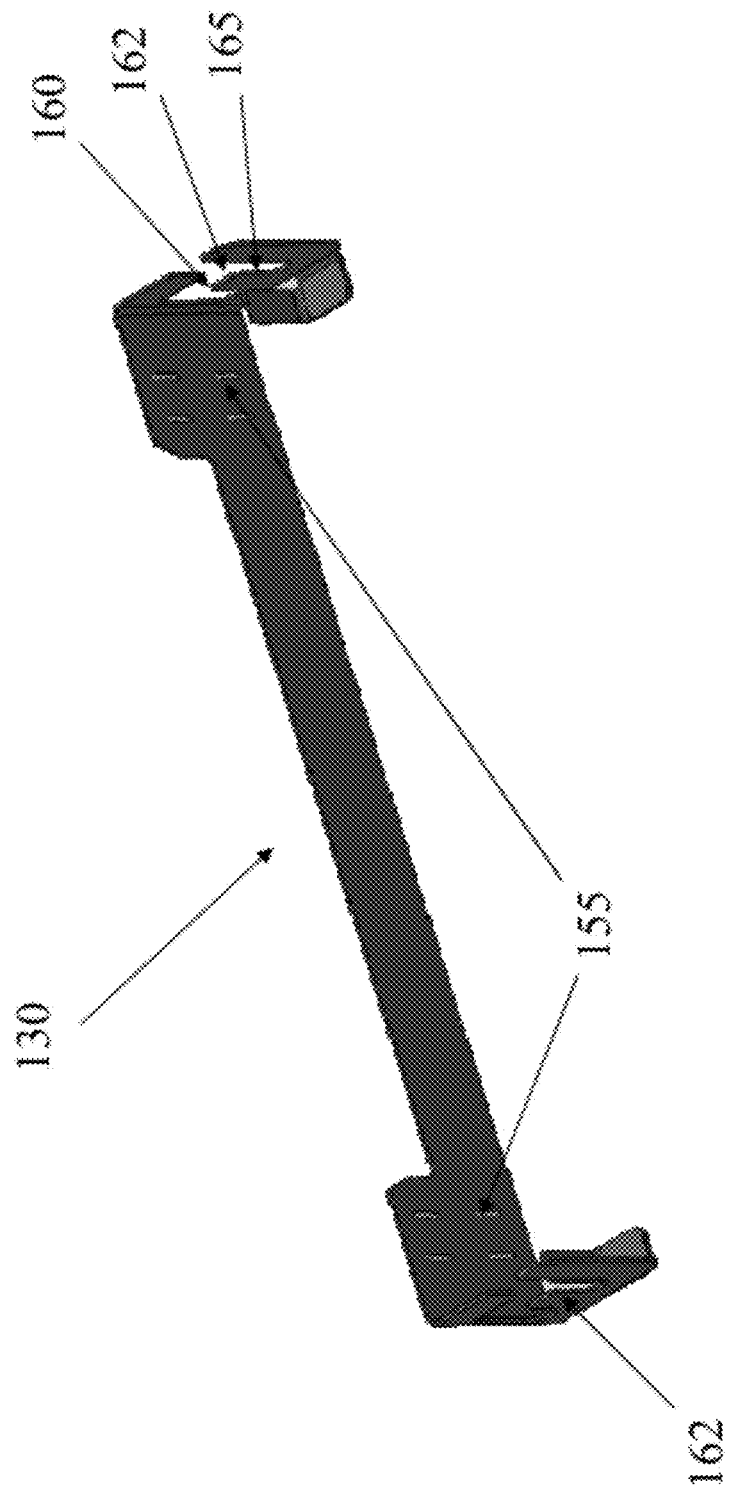
FIG. 4 illustrates a mounting bracket for use with the first embodiment crate according to the embodiments of the present invention.
Figure 5C:
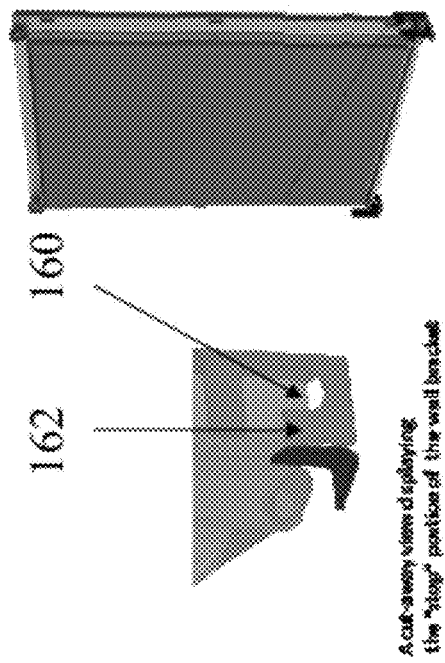

FIG. 4 shows a mounting bracket 130 which facilitates operation of the crate according to the embodiments of the present invention. The mounting bracket 130 is installed on a wall in an area where the crate 100 is to be used. The mounting bracket 130 includes a series of openings 155 through which fasteners such as screws or nails may be used to mount the bracket 130. Each end of the mounting bracket 130 includes mounting positions 160, 165 corresponding to the open configuration and collapsed configuration, respectively. In operation, as shown in FIGS. 5A through 5C, the mounting positions 160, 165 receive a mounting rod 175 integral with, or connected to, the crate 100 and extending from a first side of the crate 100 to a second side of the crate 100. The mounting rod 175 can be housed within a channel extending the width of the pet crate 100. The mounting rod 175 may also be replaced with a pair of mounting pins extending from opposite sides of the tray 120. In an open configuration, the mounting rod 175 rests within an inner mounting position 160. To transform the crate 100 from the open configuration to the collapsed configuration, after the cage 110 is folded, the user raises the crate 100 such that the mounting rod 175 exits the mounting position 160 and moves the mounting rod 175 into outer mounting position 165 such that the crate 100 can be fully raised. Transforming from the collapsed configuration to the open configuration comprises the user slightly lifting the crate 100 allowing the mounting rod 175 to exit the outer mounting position 165 and move into the inner mounting position 160 allowing the crate 100 to be lowered after which the cage 110 can be unfolded.

When in the collapsed or stowed position, the stop 162 prevents the crate 100 from lowering unintentionally by preventing the mounting rod 175 from moving from the outer mounting position 165 to the inner mounting position 160.

Folding the cage 110 is facilitated by hinges positioned about the edges of the cage 110. As shown in FIGS. 3A through 3C, in one embodiment, the side panels 111 and top panel 112 are connected to one another using hinges 103 while front panel 114 is independent. In one embodiment, a pair of spring levers 102 maintains the cage 110 in an assembled configuration and when disengaged permit the cage 110 is able to fold as described below. Hinges 104 further allow the side panels 111 to fold as well. Collapsing or folding the cage 110 comprises unlocking both spring levers 102 in the direction of arrow A as shown in FIG. 7. Using a pair of spring levers 102 prevents accidental collapsing of the cage 110. Once the spring levers 102 are disengaged, the side panels 111 can folded downward and inward about hinges 104 with the top panel 112 following. The front panel 114 is then folded down over the top panel 112. The cage 110 is thus contained within tray 120 allowing the pet crate 100 to be folded onto a wall to which the pet crate 100 is attached.

Figure 6B:
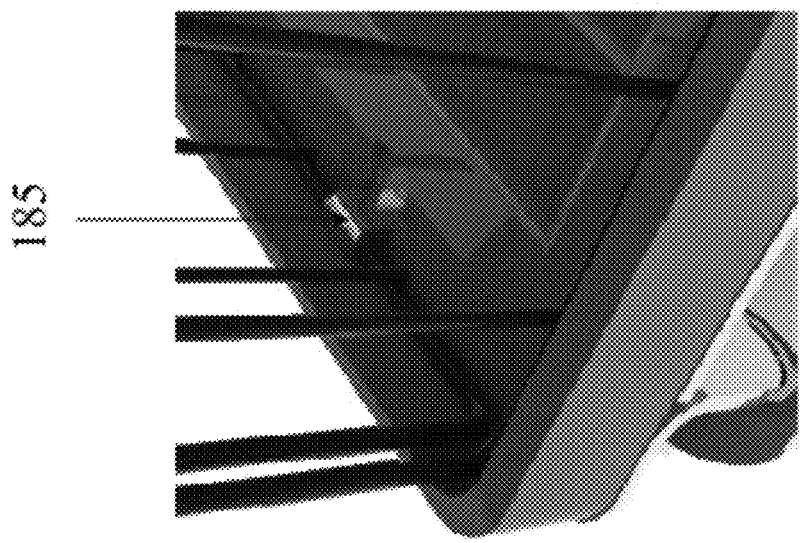
FIGS. 6A and 6B illustrate a cage lock for use with the first embodiment crate according to the embodiments of the present invention.
Figure 6A:
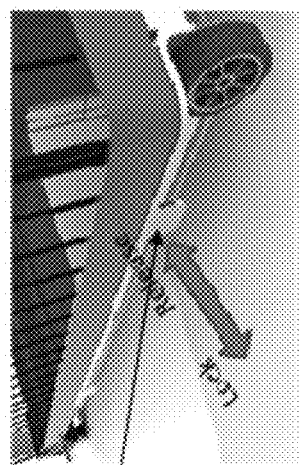

FIGS. 6A and 6B show cage release tabs 180 on outer portions of the tray 120 and corresponding cage clips 185 configured to retain lower portions of the cage 110 within the tray 120. To release the cage 110 a user depresses the release tabs 180 to move the cage clips 185 thereby releasing lower portions of the cage 110. Once all cage clips 185 are released, the cage 110 can be removed so that the tray 120 can be cleaned as necessary.

FIGS. 8A and 8B show optional wheels 101 rendering the pet crate 100 portable. Mounting rod 175 doubles as a handle to pull or push the pet crate 100 from location to location.

Figure 10A:
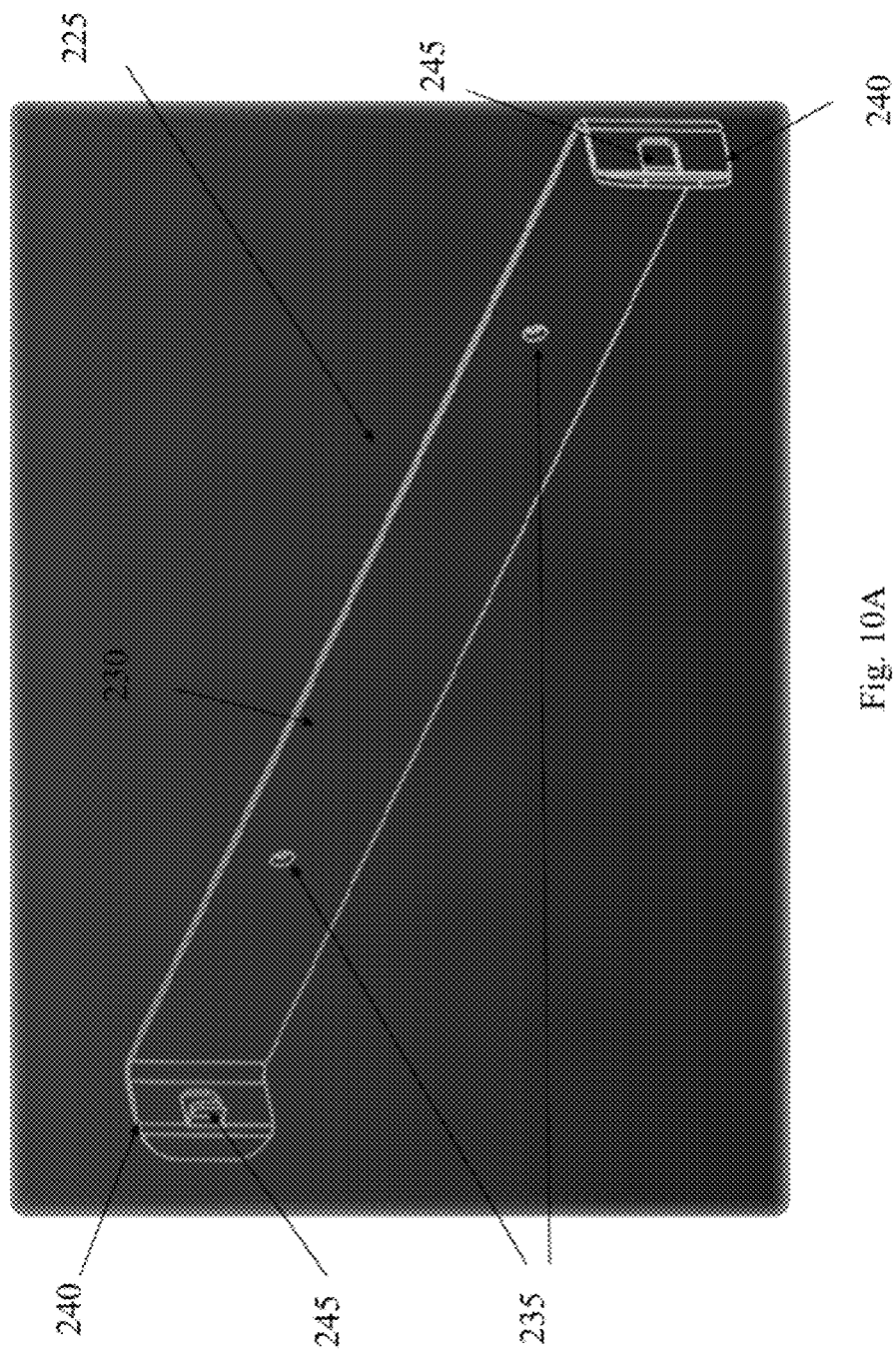

FIG. 9 shows a second embodiment of an animal crate 200 in an open position and mounted to a wall 205 while FIG. 11 shows the animal crate 200 in a collapsed or stowed position. In general, the animal crate 200 includes a foldable cage 210, bottom tray 215, formed of three walls or edges 216-218 and a portion of back wall 220. Bottom edges of the cage 210 are rotatably connected with hinges or similar mechanisms to the bottom tray 215. The bottom tray 215 and back wall 220 are rotatably joined along a rear meeting edge 211 such that the bottom tray 215 and back wall 220 may be folded to conceal the foldable cage 210. FIGS. 10A and 10B (connected to wall 205) show an exemplary bracket 225 of the type which may be used to mount the animal crate 200 to the wall 205. The bracket 225 includes a base member 230 with a pair of openings 235 for accepting fasteners to attach said bracket 225 to the wall 205. Each end 240 of the bracket 225 extends at approximately 90 degrees relative to the base member 230 and together defines a space therebetween for receipt of the back wall 220. Clips 245 on inner edges of each end 240 of the bracket 225 facilitate securing the back wall 220 and animal crate 200 to the bracket 225 and therefore wall 205.

Figure 13:
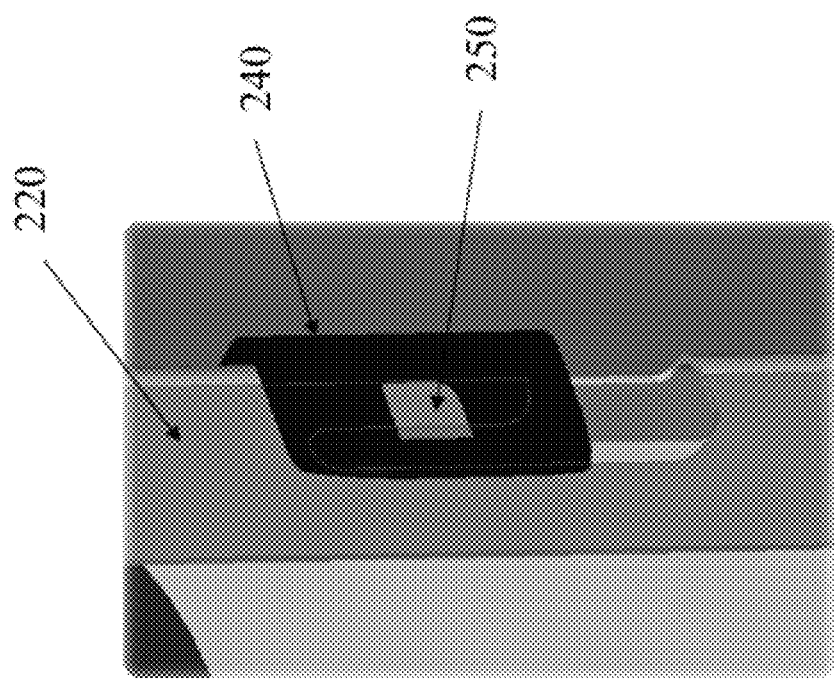
FIG. 13 illustrates the mounting bracket securing the second embodiment crate against a wall according to the embodiments of the present invention.

Now referring to FIG. 11, the animal crate 200 is collapsed and mounted to the wall 205 via the bracket 225. More specifically, as shown in FIG. 13, the clips 245 receive flanges 250 on outer edges of the back wall 220. To remove the animal crate 200 from the bracket 225, a user lifts the animal crate 200 slightly so that the flanges 250 disengage from the clips 245.

Figure 14:
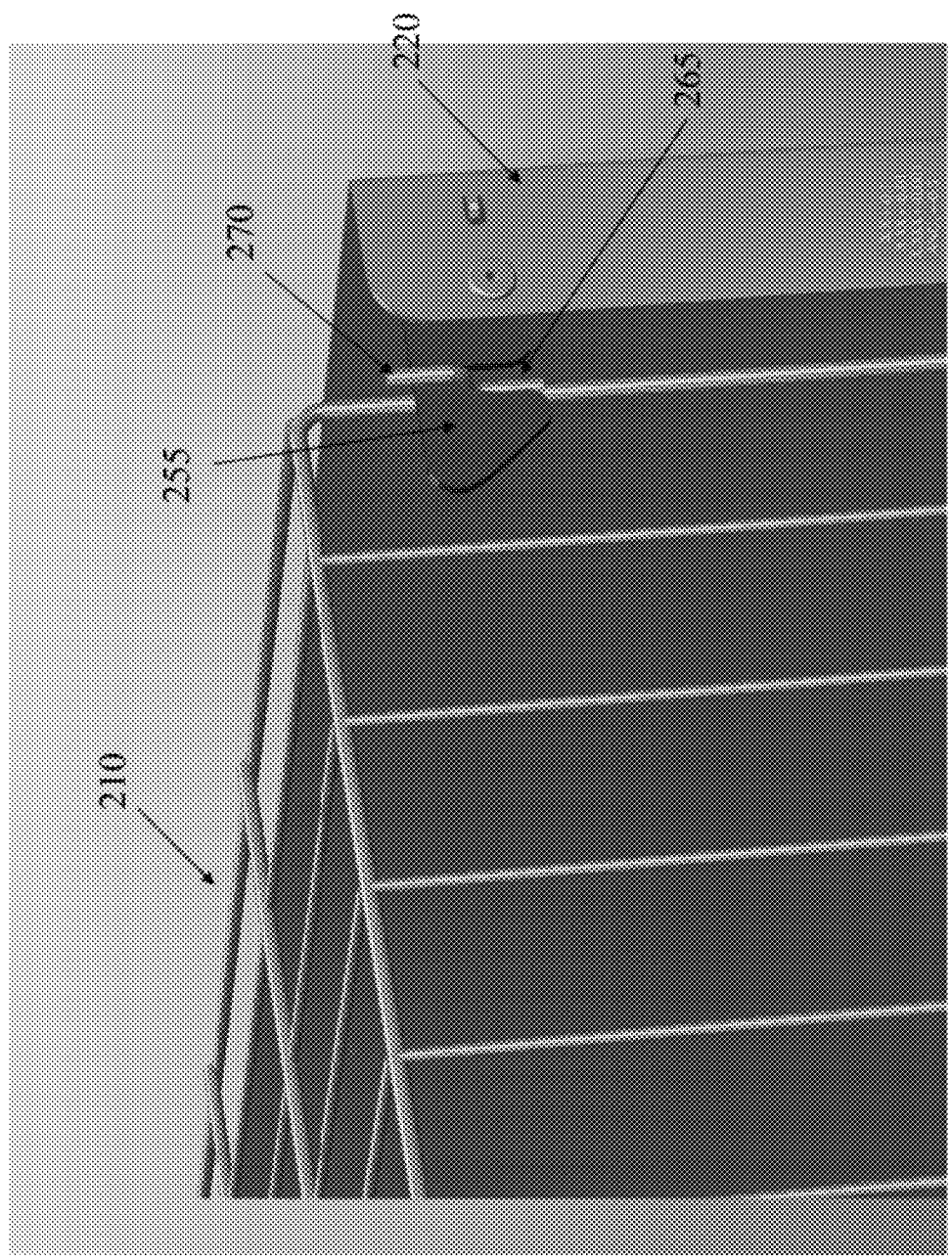
FIG. 14 illustrates the multi-use latch securing the second embodiment crate in an open position according to the embodiments of the present invention.

Deploying the cage 210 for use comprises disengaging a pair of multi-purpose latches 255 rotatably connected to opposite edges of said back wall 220 and configured to secure the bottom tray 215 and back wall 220 to one another. FIGS. 12A and 12B show one of said latches 255 engaged and disengaged, respectively. A catch 260 extending from an edge of the bottom tray 215 receives a cutout 265 of the rotatable latch 255 when engaged. Disengaging the latches 255 allows the bottom tray 215 to be rotated relative to the back wall 220 such that the contained cage 210 may be assembled as shown in FIG. 9. When the cage 210 is assembled, as shown in FIG. 14, the multi-purpose latches 255 each extend from the back wall 220 and engage oppositely positioned cage loops 270. In this manner, the latches 255 secure and support the cage 210 in the assembled position.

Figure 15A:
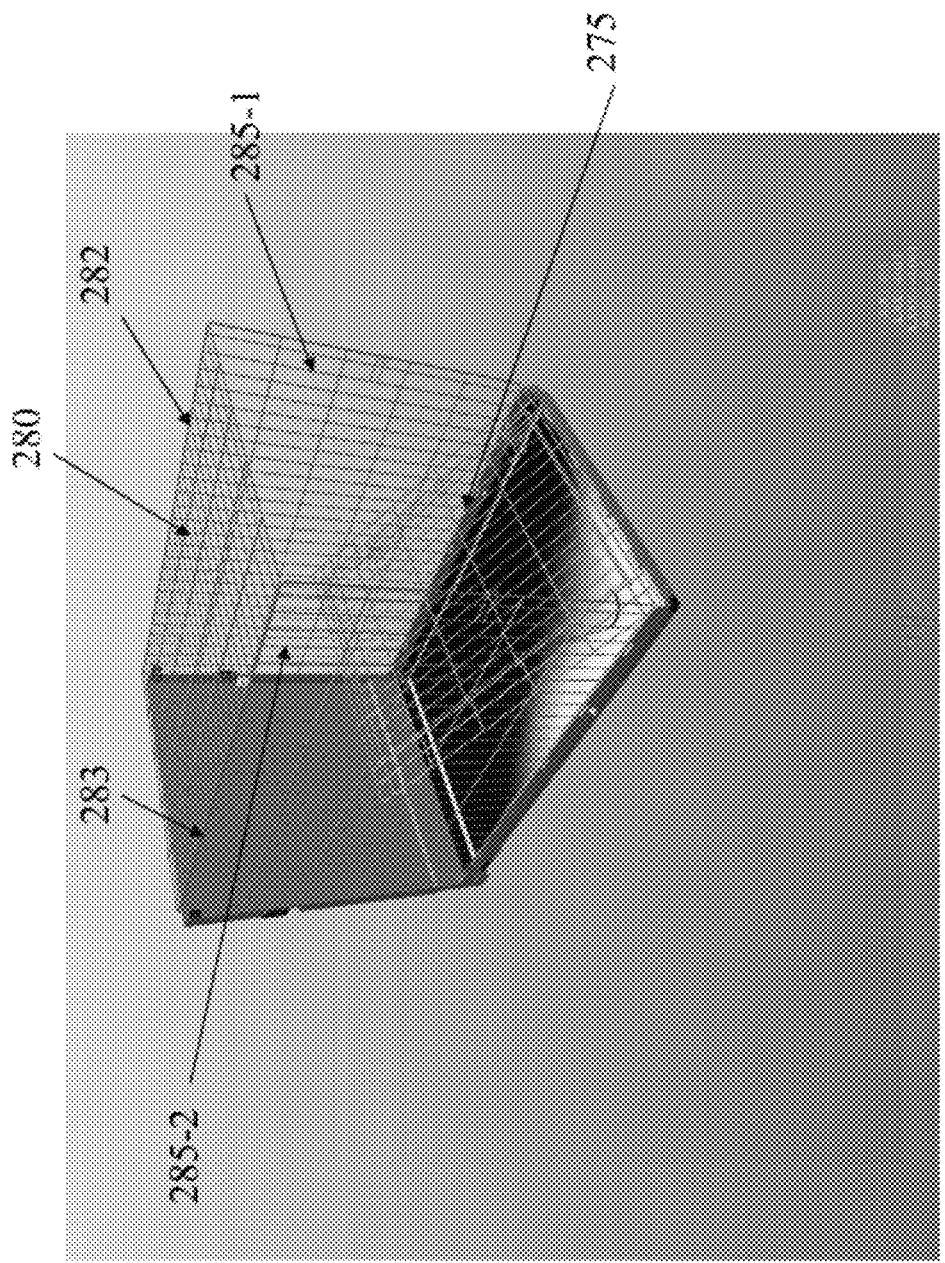
FIGS. 15 through 15H illustrate the second embodiment crate with the cage being transformed from open configuration to collapsed configuration according to the embodiments of the present invention.
Figure 15B:
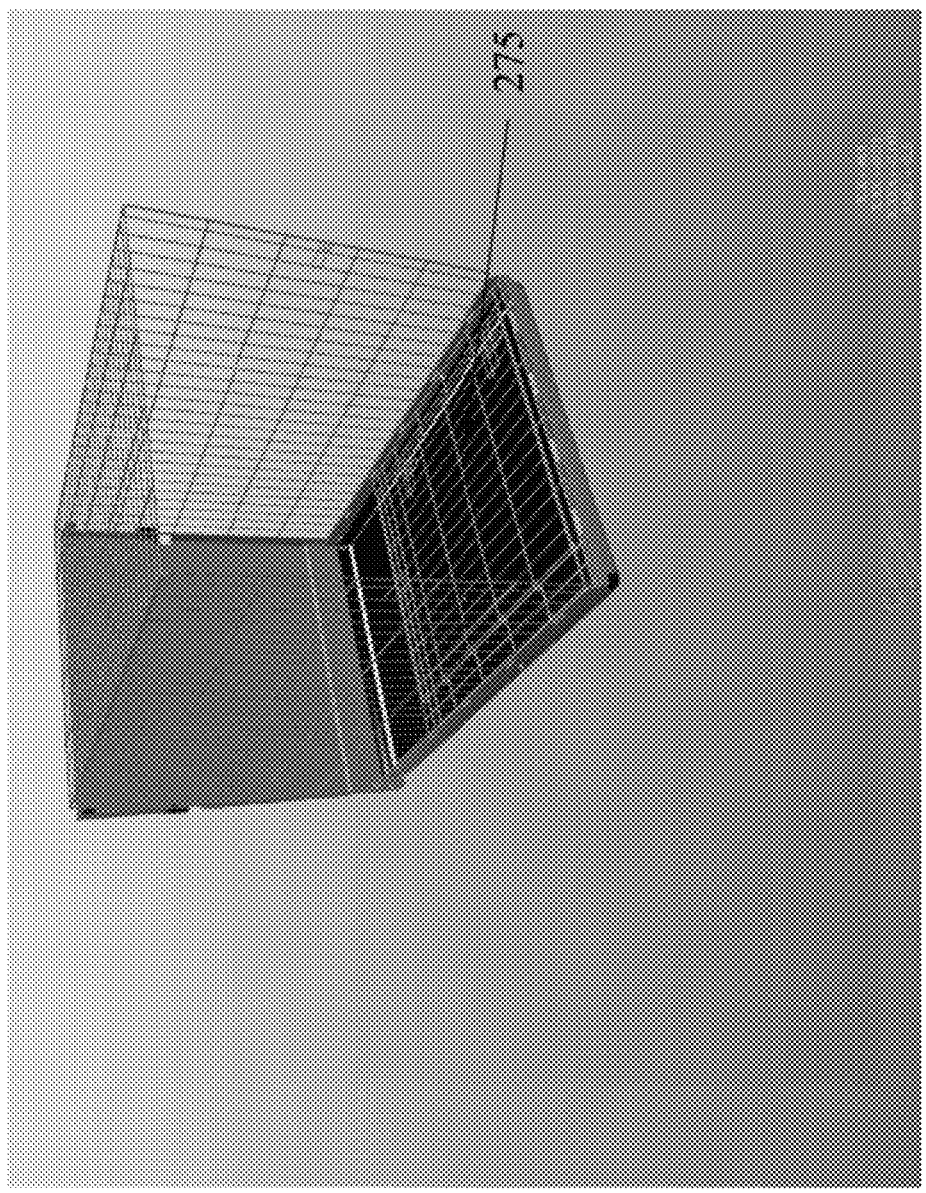
Figure 15C:
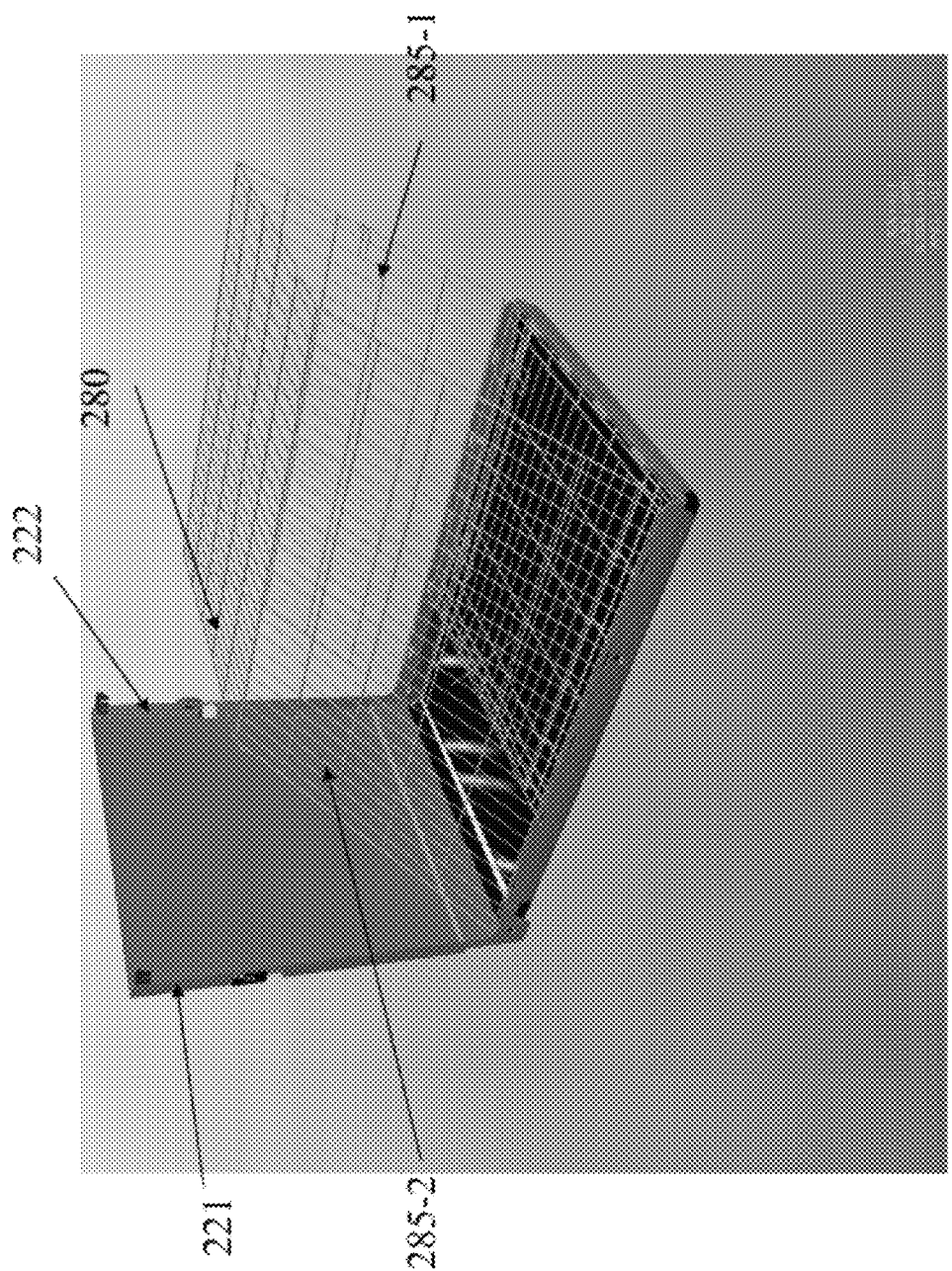
Figure 15D:
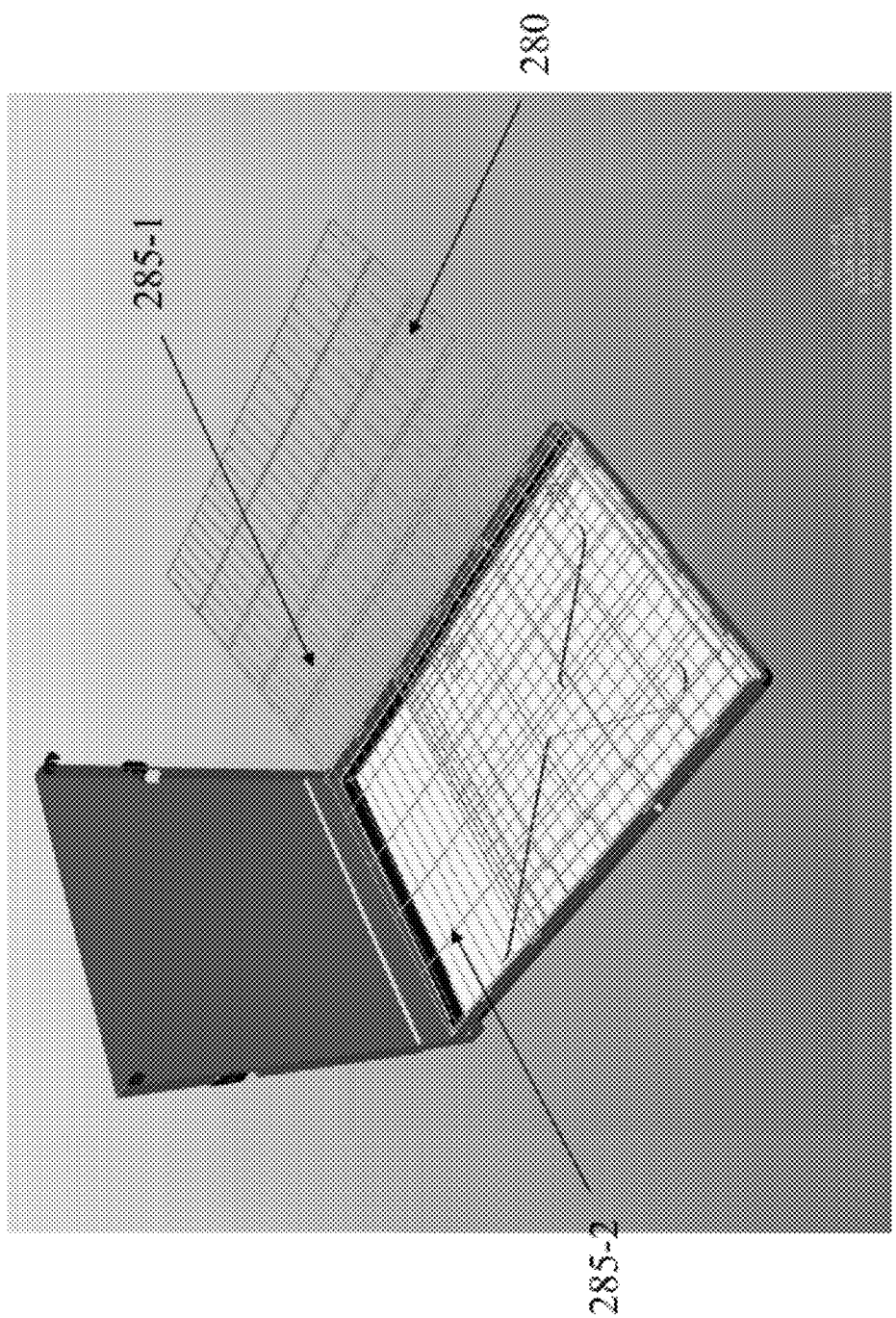
Figure 15F:
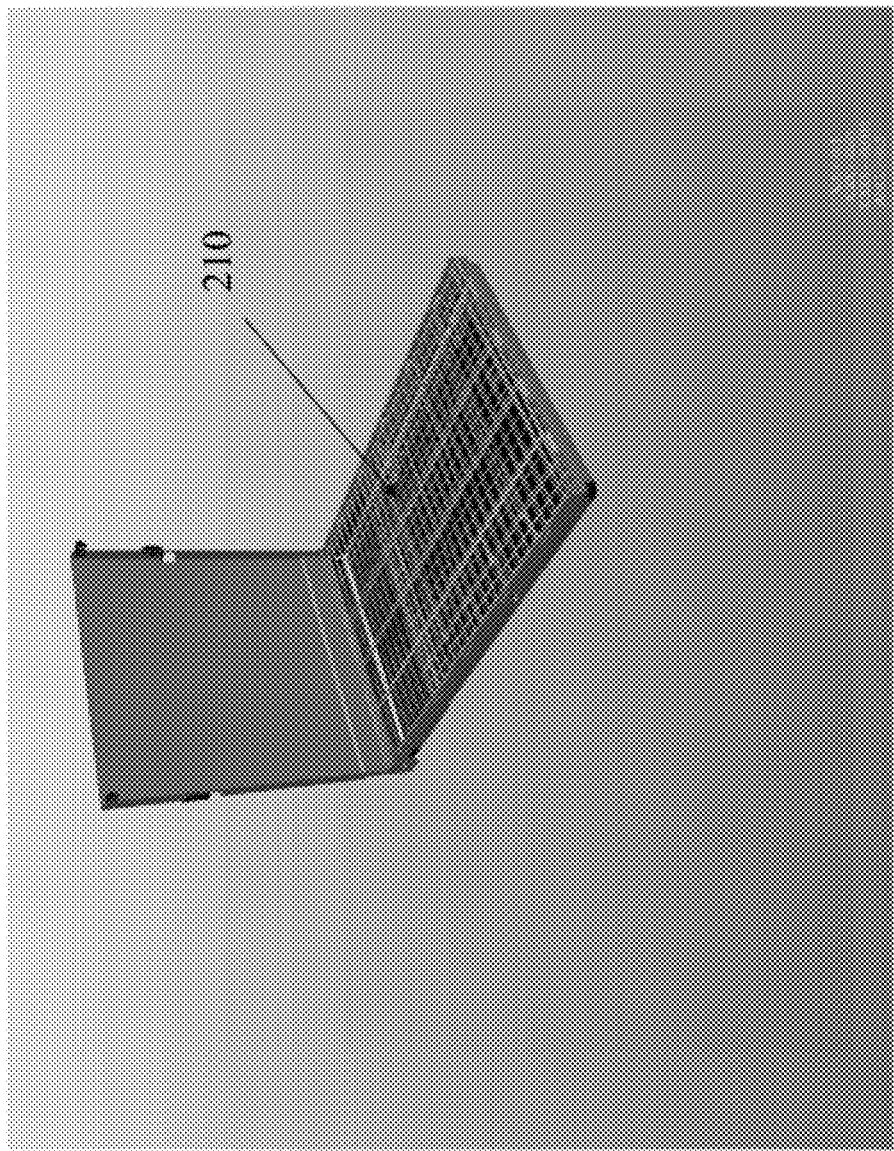
Figure 15G:
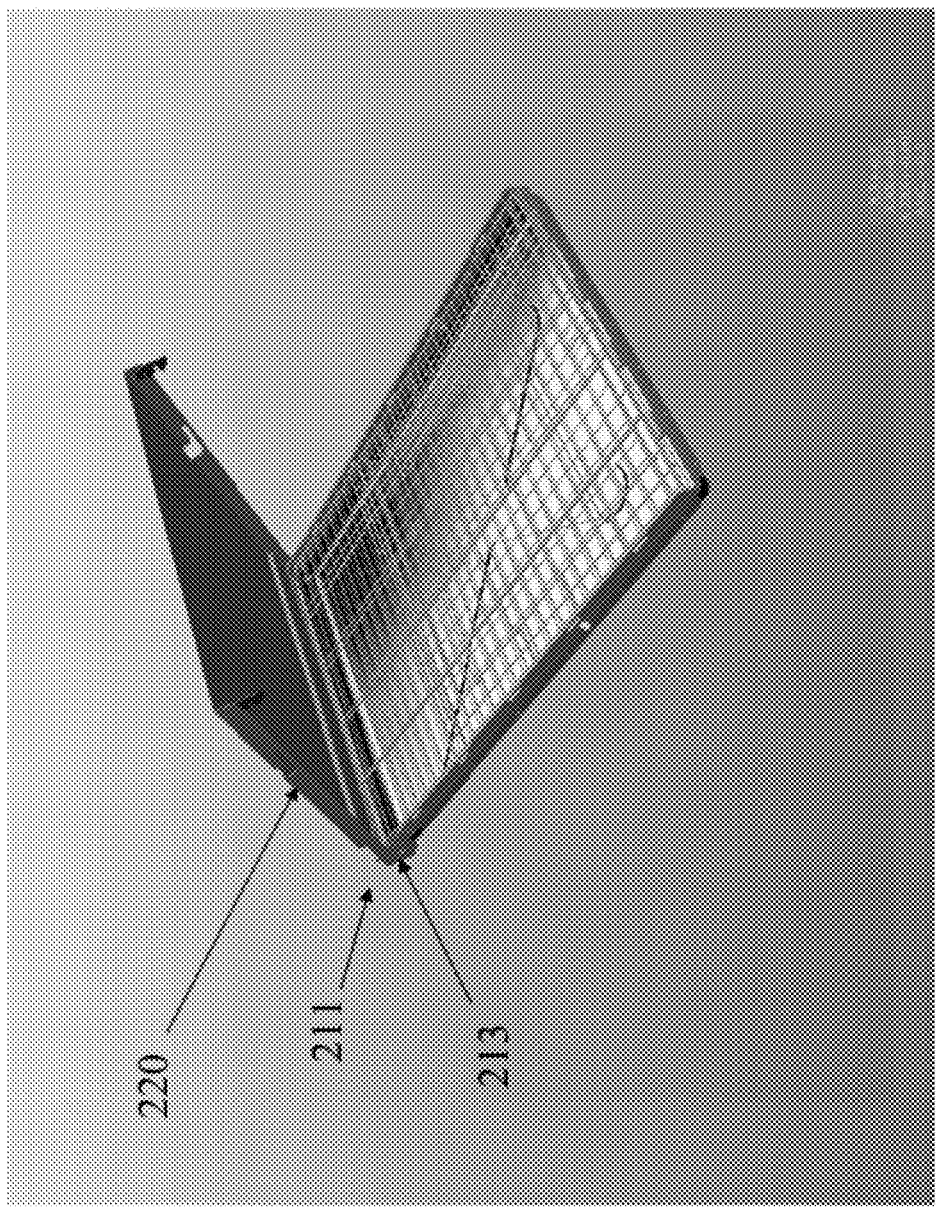

FIGS. 15 through 15H show the cage 210 being transformed from an open/assembled configuration to a closed/collapsed configuration. FIG. 15 shows the animal crate 200 in a fully assembled configuration with the cage 210 erect and useable to retain an animal. Door 212 provides an egress for an animal. In FIGS. 15A and 15B, a front cage panel 275 is disengaged from a top cage panel 280 and/or side cage panels 285-1, 285-2 and collapsed towards the bottom tray 215 (i.e., the front cage panel 275 rotates about a lower edge). The rotation may be facilitated by hinges or similar mechanisms. In FIG. 15C, the latches 255 are disengaged from the cage loops 270 such that the top cage panel 280 and side cage panels 285-1, 285-2 may be collapsed towards the bottom tray 215 and front cage panel 275 which now rests on the bottom tray 215. The side cage panels 285-1, 285-2 and top cage panel 280 are rotatably joined with hinges or similar mechanisms at common edges 282, 283. In FIG. 15D, the side cage panel 285-2 is on top of the front cage panel 275 now collapsed on the bottom tray 215, and the top cage panel 280 and the side cage panel 285-1 are collapsed adjacent to the bottom tray 215. In FIG. 15E, the top cage panel 280 and the side cage panel 285-1 are collapsed towards the bottom tray 215, front cage panel 275 and side cage panel 285-2. FIG. 15F shows the cage 210 fully collapsed substantially within the bottom tray 215. FIG. 15G shows the back wall 220 being collapsed via hinges 213 or similar mechanism along rear meeting edge 211 (the crate 200 is not mounted to a wall as shown) and FIG. 15H shows the back wall 220 fully collapsed such that the cage 210 is contained between the back wall 220 and bottom tray 215. In the collapsed configuration, outer edges 221, 222 of the back wall 220 contain walls 216, 218 of the bottom tray 215 and lock to contain the crate 200 in the collapsed configuration.

Figure 16:
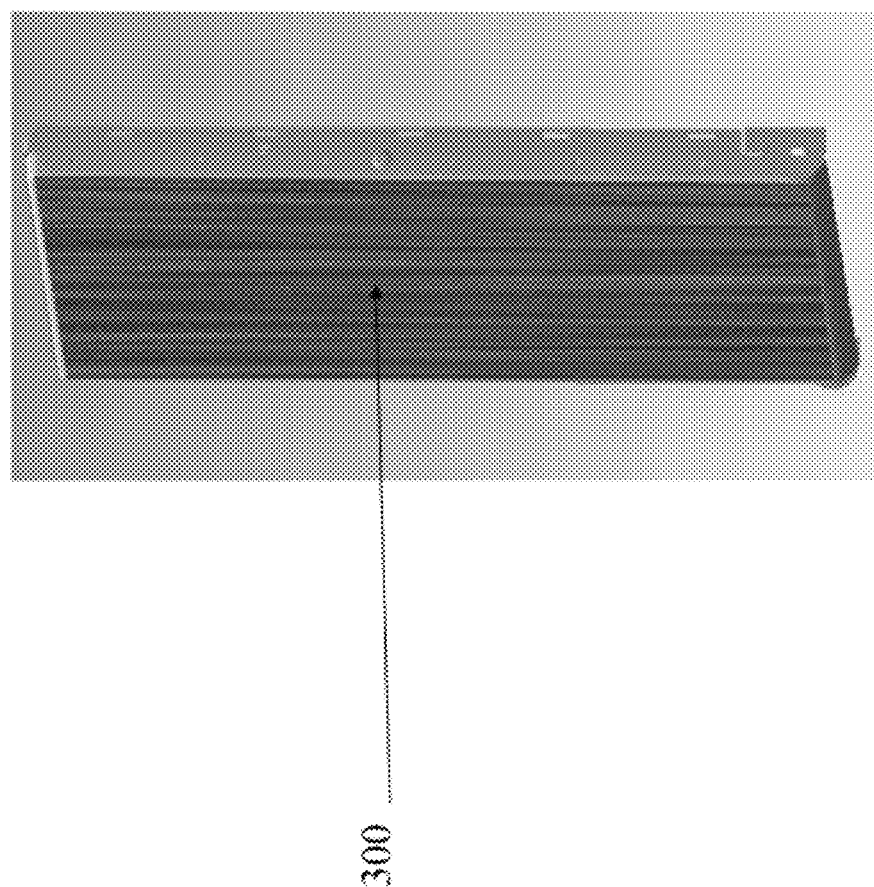
FIG. 16 illustrates a cover or coat for concealing or decorating the crate in a collapsed configuration according to the embodiments of the present invention.

When collapsed and folded against the wall 205, the bottom surface of the bottom tray is viewable. A magnetic cover or other type of cover 300, as shown in FIG. 16, may be used to decorate the animal crate 100, 200 when in the collapsed configuration. For example, the cover 300 may be colored to blend with the wall 205 (i.e., a wood panel design) thus concealing the animal crate 100, 200 or may be decorated (i.e., flowers) to highlight the animal crate 100, 200.

The animal crate 100, 200 and components thereof may be fabricated of known materials such as metals, alloys, plastics, composites and the like.

Although the invention has been described in detail with reference to several embodiments, additional variations and modifications exist within the scope and spirit of the invention as described and defined in the following claims.

I claim:

1. An animal crate comprising:
   a bottom tray;
   a foldable cage supported by said bottom tray, said foldable cage substantially contained by said bottom tray when said foldable cage is collapsed;
   a mounting rod extending through said bottom tray and into a wall-mounted bracket, or a pair of mounting pins extending from said bottom tray and into said wall-mounted bracket, said rod and/or pins permitting rotation of said bottom tray and contained foldable cage when on a ground surface adjacent to a wall from a first position on the ground surface to a second position against a wall and vice versa; and
   wherein said wall-mounted bracket acts to secure said bottom tray and contained foldable cage in said second position against said wall.

2. The animal crate of claim 1 further comprising a cover configured to adhere to said bottom tray when said animal crate is said second position against said wall.

3. An animal crate comprising:
   a foldable cage connected to a bottom tray, said foldable cage substantially contained by said bottom tray when said foldable cage is collapsed;
   a mounting rod with ends extending from said bottom tray;
   a mounting bracket mountable to a wall; and
   wherein said ends of said mounting rod fit into said mounting bracket whereby said ends of said mounting rod are in a first mounting bracket position corresponding to a collapsed cage configuration wherein said foldable cage is folded into said bottom tray against said wall and a second mounting bracket position corresponding to an assembled configuration wherein said foldable cage is unfolded and said bottom tray is on a ground surface, said mounting rod rotatable within said mounting bracket to rotate said foldable cage and bottom tray from an assembled configuration on the ground to a collapsed configuration against the wall and vice versa.

4. The animal crate of claim 3 further comprising a cover configured to adhere to said bottom tray when said animal crate is in a collapsed configuration against said wall.

5. An animal crate comprising:
   a foldable cage connected to a bottom tray, said foldable cage substantially contained by said bottom tray when said foldable cage is collapsed;
   a pair of mounting pins extending from said bottom tray;
   a mounting bracket mountable to a wall; and
   wherein said mounting pins fit into said mounting bracket whereby said mounting pins are in a first mounting bracket position corresponding to a collapsed configuration wherein said foldable cage is folded into said bottom tray against said wall and a second mounting bracket position corresponding to an assembled configuration wherein said foldable cage is unfolded and said bottom tray is on a ground surface, said mounting pins rotatable within said mounting bracket to rotate said foldable cage and bottom tray from an assembled configuration on the ground to a collapsed configuration against the wall and vice versa.

6. The animal crate of claim 5 further comprising a cover configured to adhere to said bottom tray when said animal crate is in a collapsed configuration against said wall.

\* \* \* \* \*